(12) United States Patent
Ciniglio

(10) Patent No.: US 8,297,487 B2
(45) Date of Patent: *Oct. 30, 2012

(54) QUICK-LOADING SOLDERING APPARATUS

(75) Inventor: Alexander James Ciniglio, Essex (GB)

(73) Assignee: Pillarhouse International Limited, Chelmsford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,288

(22) Filed: Nov. 21, 2011

(65) Prior Publication Data
US 2012/0061451 A1 Mar. 15, 2012

Related U.S. Application Data

(63) Continuation of application No. 12/855,530, filed on Aug. 12, 2010, now Pat. No. 8,066,172.

(30) Foreign Application Priority Data

Aug. 25, 2009 (GB) .................................. 0914850.3

(51) Int. Cl.
B23K 37/00 (2006.01)
(52) U.S. Cl. .............................. 228/37; 228/43; 228/49.5
(58) Field of Classification Search .................. None
See application file for complete search history.

(56) References Cited

U.S. PATENT DOCUMENTS

| 3,036,937 | A | * | 5/1962 | Ingraham | 438/352 |
|---|---|---|---|---|---|
| 3,698,621 | A | * | 10/1972 | Burke et al. | 228/4.1 |
| 4,151,945 | A | | 5/1979 | Ragard et al. | |
| 4,561,586 | A | * | 12/1985 | Abel et al. | 228/264 |
| 4,602,417 | A | | 7/1986 | Mesch et al. | |
| 5,082,165 | A | * | 1/1992 | Ishizuka | 228/179.1 |
| 5,178,315 | A | * | 1/1993 | Konno et al. | 228/44.7 |
| 5,181,646 | A | * | 1/1993 | Ushiki et al. | 228/4.5 |
| 5,462,216 | A | | 10/1995 | Nishimura | |
| 5,482,198 | A | * | 1/1996 | Kohn | 228/6.2 |
| 5,516,026 | A | | 5/1996 | Ariye et al. | |
| 5,518,562 | A | | 5/1996 | Searle et al. | |
| 5,579,980 | A | * | 12/1996 | Ichikawa | 228/6.2 |
| 5,772,768 | A | | 6/1998 | Inagaki et al. | |
| 5,979,739 | A | * | 11/1999 | Jin et al. | 228/6.2 |
| 5,988,481 | A | * | 11/1999 | Torihata et al. | 228/49.5 |
| 6,092,713 | A | | 7/2000 | Kim | |
| 6,223,800 | B1 | * | 5/2001 | Kim et al. | 156/556 |
| 6,347,733 | B1 | | 2/2002 | Hickey, II | |
| 6,820,792 | B2 | | 11/2004 | Kim et al. | |
| 7,144,813 | B2 | | 12/2006 | Wirth et al. | |
| 7,293,691 | B2 | | 11/2007 | Rossmeisl et al. | |
| 7,357,288 | B2 | * | 4/2008 | Hosotani et al. | 228/6.2 |
| 2001/0015372 | A1 | | 8/2001 | Yamamoto et al. | |

(Continued)

FOREIGN PATENT DOCUMENTS

GB 2209132 A * 5/1989

(Continued)

Primary Examiner — Kiley Stoner
(74) Attorney, Agent, or Firm — Dickstein Shapiro LLP

(57) ABSTRACT

A quick-loading soldering apparatus for soldering PCBs comprises a rotatable deck which has a plurality of angularly spaced PCB work sites. While a first PCB work site is angularly positioned for pre-loading and pre-heating PCB components at a pre-loading station, a second PCB work site is angularly positioned for soldering pre-loaded PCB components at a soldering station. Correct rotation of the deck is ensured by a sensor mounted on the deck. If the rotation angle is correct, locator pins provided externally of the deck become actionable by an operator to register the deck prior to the PCB being soldered.

20 Claims, 11 Drawing Sheets

U.S. PATENT DOCUMENTS

| | | | |
|---|---|---|---|
| 2006/0202001 A1* | 9/2006 | Birchall et al. | 228/264 |
| 2007/0157464 A1 | 7/2007 | Jeon et al. | |
| 2010/0044414 A1 | 2/2010 | Charbel et al. | |

FOREIGN PATENT DOCUMENTS

| | | | |
|---|---|---|---|
| JP | 59 174272 A | | 10/1984 |
| JP | 61-253169 A | | 11/1986 |
| JP | 61 286057 A | | 12/1986 |
| JP | 02-181944 A | * | 7/1990 |
| JP | 11 059857 A | | 3/1999 |
| JP | 2000-198143 A | * | 7/2000 |
| JP | 2004-111667 A | | 4/2004 |
| JP | 2005-353965 A | | 12/2005 |
| WO | WO 2009/027651 A1 | | 3/2009 |

* cited by examiner

QUICK-LOADING SOLDERING APPARATUS

This is a continuation of application Ser. No. 12/855,530, filed Aug. 12, 2010, now U.S. Pat. No. 8,066,172, which claims priority to GB Application No. 0914850.3, filed Aug. 25, 2009.

BACKGROUND OF THE INVENTION

1. Field of the Invention

The present invention relates to a soldering apparatus, or more specifically a printed circuit board (PCB) soldering apparatus. The present invention attempts to improve upon prior art soldering apparatus by allowing a faster loading speed, or a shorter PCB loading and soldering cycle time— i.e. the present invention provides a quick-loading or quick-cycling soldering apparatus.

The area of application for the present invention is preferably in low volume soldering situations, i.e. where manual or only semi-automated loading of components, onto a blank PCB are carried out. It is particularly suitable for dip, wave or jet soldering apparatus where solder is applied to leads of PCB components from below the PCB, such as in WO2009/027651.

2. Description of the Related Art

Low-volume soldering apparatus in which electronic components of a PCB are soldered onto the board are well known. In those prior art arrangements, a blank PCB is loaded, typically by hand, with electronics components such that the leads of the components poke through the holes in the PCB. That loaded, but unsoldered, PCB is then carried from the loading table to an available soldering apparatus. While that loading was taking place, an earlier-loaded PCB might have been being soldered by that same apparatus, so the soldering of that earlier PCB must first be completed, and the then soldered PCB must then be removed to render the soldering apparatus available for receiving the newly loaded PCB. This results in a slow cycle time. It is also presents the possible problem of components wobbling on the PCB during transit to the soldering apparatus since the PCB must be carried thereto.

Attempts to address this problem have been made in the more automated systems of the art. As such, automated PCB soldering apparatus in which PCB components are soldered while others are pre-loaded in preparation for soldering are also known in the art. Such soldering apparatus are typically high volume arrangements involving robotics, with an in-line arrangement having a loading station, a soldering apparatus and an unloading station. The various stations are therefore dedicated to the performance of a production step in the manufacturing process of a PCB. Loading, soldering and off-loading may be performed by an operator manually, but it is typically partially or fully automated so as to make it suitable for large scale production of PCBs.

The present invention, however, attempts to improve low-volume soldering apparatus, although its solution might equally improve automated, high or higher volume soldering apparatus.

SUMMARY OF THE INVENTION

According to the present invention there is provided a loading deck for a soldering apparatus in or on which an empty PCB is loaded with its required components, and in or on which that then loaded PCB is then soldered, the loading deck having two loading/soldering stations, and being adapted for rotational mounting within or on the soldering apparatus for rotation within the plane of the deck. The provision of the two stations and the rotational mounting within or on the soldering apparatus allows a loaded PCB at one of the stations to be being soldered while a new PCB is being loaded with components. Further, by rotating the loading deck, minimal disturbance of unsoldered components on the PCB will occur between the loading step and the soldering step since there is no need for the operator to carry the unsoldered but loaded board from a loading station to an available soldering apparatus, or to put it down while removing a completed board from the soldering apparatus.

The present invention also comprises a soldering apparatus comprising a loading deck as described above.

The loading deck may have more than two stations.

Preferably each station is rotationally symmetrical to the others. More preferably each station is angularly positioned around the deck with respect to one another, with angles between them being equally spaced—180° for two stations (each station switching between being a component loading/completed PCB unload station and a soldering station), 120° for three stations (each station switching between being a component loading station, a soldering station and a completed PCB unload station), and 90° for four stations (each station switching between being a component loading station, a soldering station, a completed PCB unload station and a station with some other, possibly optional, function, such as a quality control inspection station, or a pre-heat station). Yet further additional stations might also be desirable, e.g. for additional heating/cooling/quality control steps, the angles between the stations being adapted accordingly.

A heater is preferably supplied for the soldering apparatus. The heater, in use, may be above or below the deck, or two heaters may be provided—one above the deck and one below the deck.

The or each heater may be moveable into (or out of) a position for heating a PCB.

Preferably the heater is contained within a heater housing.

A slideway or mount-mechanism can be provided for allowing movement of the heater. The slideway or mount-mechanism can be underneath or above, or both, the deck. The heater can then be used for applying a targeted PCB pre-heat treatment to the PCB.

The slideway or mount mechanism can be supplied without a heater—the heater is then supplied separately, e.g. by a heater manufacturer.

The PCB heat treatment can be applied either during or after the loading phase for pre-heating the PCB prior to soldering—pre-heating improves the integrity/accuracy of the solder joint between the leads of the components and the circuitry of the PCB. Preferably the pre-heating is at least applied to the lower side of the PCB to raise it to a predetermined temperature that facilitates reliable or accurate soldering. Preferably that temperature is a temperature in excess of 100° C. For example, the predetermined pre-heated temperature can be about 110° C.

Preferably, the deck, within the soldering apparatus, is configured for rotation within a horizontal plane. This keeps the pre-loading and soldering stations level with one another, and the PCBs themselves level, so that no significant vertical or out-of-plane movements occur to the PCB/components between them being loaded onto the deck and them being soldered. This minimises the risk of improper component placement in the finally soldered PCB.

The deck may be provided with one or more handles for manually rotating the deck as well as, as a safety measure, for delimiting the rotation space. For that latter purpose, preferably a circumferential handle is supplied. This keeps the operator clear of the rotation space of the deck.

Preferably the deck is pivotally mounted at its centre to a stationary frame of the soldering apparatus, the stationary frame providing support means for operative and movable modules of the soldering apparatus, such as heaters, soldering mechanisms (wave pools or nozzles for dip or jet soldering), and fluxing apparatus.

A motor might be provided for rotating the deck. Preferably, however, the deck is rotated by hand.

Preferably a foot pedal is provided for providing a control for the deck. The pedal might control the motor, or it might control a deck registration system for ensuring accurate registration of the deck, and thus the PCB within the soldering apparatus, following a rotation of the deck.

Preferably at least one sensor is provided for sensing the location of the deck thereby assisting in the proper registration of the loaded PCB within the soldering apparatus. The sensor may be provided on the frame of the soldering apparatus. Preferably the sensor is adapted to sense a registration mark or registration post. Where the sensor is on the frame, the registration mark or post is either on the deck or on the loaded PCB.

Upon registration of the registration mark or post with the sensor an accurate or approximate registration of the deck/PCB can be confirmed by the sensor.

Preferably at least one locator pin is provided for providing a mechanical registration of the deck relative to the frame of the soldering apparatus. The locator pin, where provided on the frame of the soldering apparatus, is for locating within a locator hole on the deck or in the PCB. Alternatively the pin might be provided on the deck and the hole might be located on the frame of the soldering apparatus. The locator pin arrangement ensures a very accurate registration of the deck/loaded PCB relative to the soldering mechanism of the apparatus, and it is preferably engaged before any soldering operation starts. The foot pedal might be linked to circuitry for checking that the locator pin is correctly engaged within the locator hole, or to the sensor arrangement, or both.

The or each locator pin is preferably moved axially, when actioned, to engage with the deck, e.g. by means of a piston/cylinder arrangement.

Where provided, the sensor can be configured for outputting a signal (e.g. to the operator by way of a confirmation light) when the deck has been rotated through the correct rotation angle. Likewise, the locator pin(s) can be configured for becoming actionable by an operator only upon an output of a correct registration signal from that sensor, e.g. upon actuating the foot pedal. This allows the deck to be locked relative to the soldering apparatus only when it has been positioned in a correct registration position.

Ideally, the stations on the deck are substantially equally spaced, angularly, relative to the centre of rotation of the deck, so that the deck will be rotated, each time, through a same angle.

In the preferred embodiment, the stations on the deck are spaced substantially 180 degrees apart on the deck so that while a PCB is being soldered at the soldering station, a just-soldered PCB can be off-loaded from the deck at the pre-loading station by the operator just before he or she loads a new blank PCB, and then its components, onto the free station of the deck, all while the soldering takes place at the other station. This configuration is very suitable for a stand-alone, single operator, manually loaded, PCB soldering apparatus.

However, it may be desirable to integrate the invention into a PCB production line. Therefore, in another embodiment of the present invention, four stations are provided on the deck, each spaced substantially 90 degrees apart, so that two opposite stations sites can interact in-line with the production line. For example one of the two opposite sites may be used for loading a blank PCB and its components, all from the line onto the deck and the other can then be for off-loading a soldered PCB from the deck still along the line. The soldering would then have been performed at the side of the line at a third station of the deck—one of the other two stations. The fourth and final station—opposite the soldering station—would then potentially be a non-functional station. Alternatively, two soldering stations might be provided, with the former unloading station actually being a secondary loading station (e.g. for loading a further PCB or for loading an inverted side of the original PCB, such as where the PCB might be a dual sided PCB). This allows two operators to undertake separate PCB loading routines without risking a confusion of non-interchangeable components.

Another embodiment of the present invention has just three work stations, each spaced substantially 120 degrees apart. This arrangement lends itself to a semi-automated arrangement, such as where the loading station and the unloading stations are separate. For example, the unloading of a soldered PCB could be carried out by a simple robotic arm, at the third station, for further handling of that PCB, although manual unloading by a second operator is also possible. However, with this arrangement the operator at the first station—the loading station—could always be presented with an available (i.e. empty) loading station for allowing him to rapidly commence his PCB loading operation, i.e. without first having to unload and relocate a soldered PCB.

In one method of operation forming an aspect of the present invention, PCB components are pre-loaded onto a first PCB work site at a pre-loading station and then the deck is rotated through an angle suitable for the first PCB work site to reach a soldering position at a soldering station and for a second PCB work site to replace the first PCB work site in a pre-loading position at the pre-loading station for pre-loading new PCB components.

In another method of operation forming another aspect of the present invention, intermediate steps of inserting a pre-heater in a provided slot way for pre-heating the PCB components prior to soldering and then removing the pre-heater prior to rotating the deck may be added.

The present invention also provides a method of loading and soldering a PCB in a soldering apparatus comprising providing a rotatable deck within a soldering apparatus the deck having at least two PCB work stations in or on it, loading a PCB and then PCB components into or onto a first of the PCB work stations and then rotating the deck, with the loaded PCB, through a suitable angle for positioning that first PCB work station into a soldering position within the soldering apparatus, that rotation of the deck moving a second of the PCB work stations from that soldering position into a non-soldering position. This arrangement allows a second PCB work station to replace the first PCB work station at a pre-loading position beside the soldering apparatus for pre-loading a new PCB and its components while the soldering of a previously loaded PCB is carried out also on that soldering apparatus.

Preferably the method is carried out using an apparatus as defined above.

Preferably a signal output from a sensor is checked to confirm the correct rotation of the deck, and, in the affirmative, one or more locator pin can be activated for mechanically registering the deck in place relative to the frame of the soldering apparatus before further soldering starts.

Preferably the angle of rotation is one of 90°, 120° or 180°. Where the angle is 180°, PCB components are pre-loaded onto a first PCB work station of the deck at the pre-loading station, and upon the deck being rotated 180°, the first PCB work station is rotated within the plane of the deck into a soldering station within the soldering apparatus, and a second PCB work station of the deck rotates into the pre-loading position of the soldering apparatus for loading of a further PCB (and where necessary, the unloading of a soldered PCB).

Other similar methods of operation of the invention, forming other aspects of the invention, are provided corresponding to embodiments with 3 or 4 work sites, respectively spaced at 120 or 90 degrees on the deck, as it will be apparent to the person skilled in the art.

BRIEF DESCRIPTION OF THE DRAWINGS

The invention will now be described, by way of example only, with reference to the accompanying drawings in which.

DETAILED DESCRIPTION OF THE PREFERRED EMBODIMENTS

Figure 1:
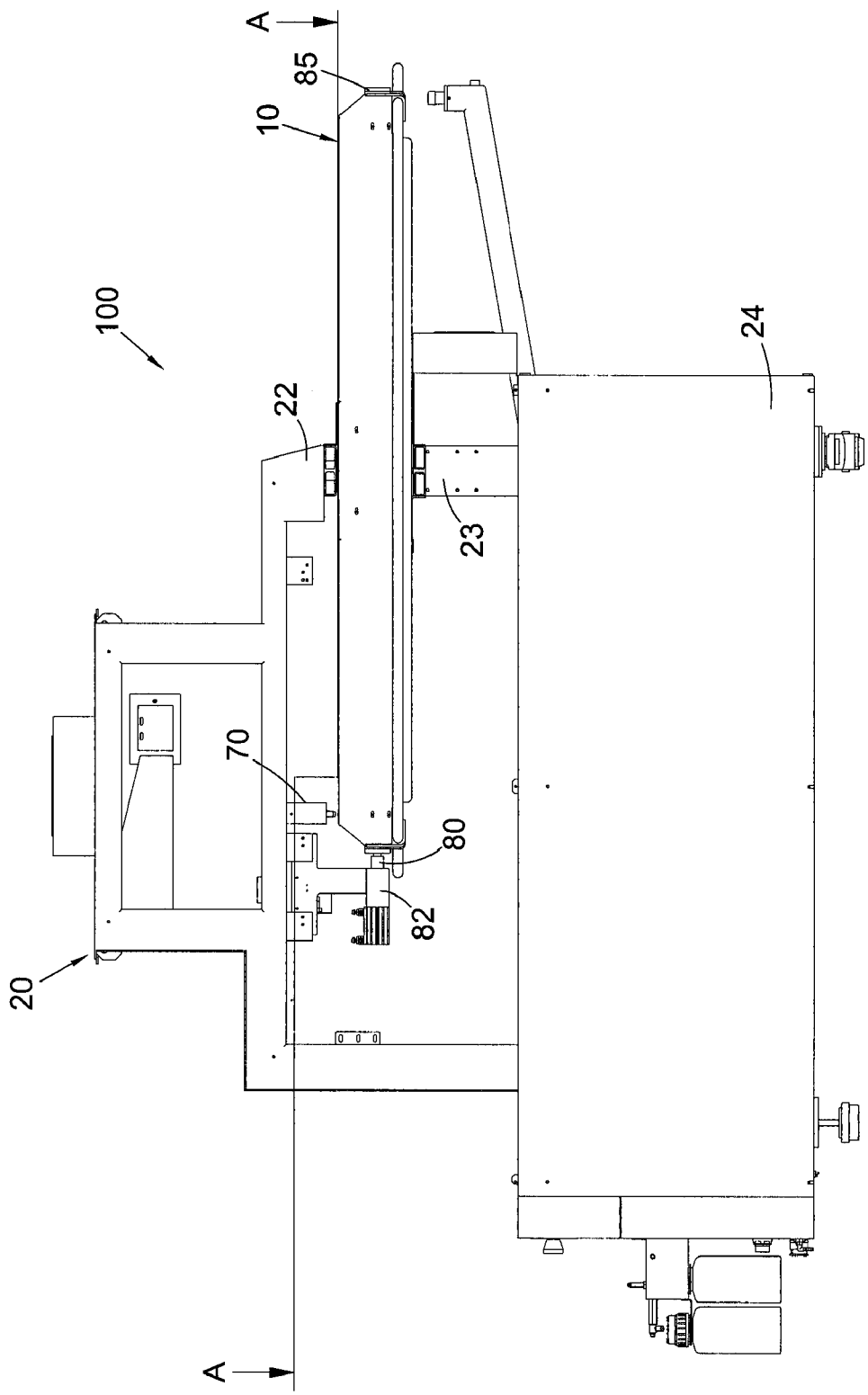
FIG. 1 is a side view of an apparatus forming an embodiment of the present invention.
Figure 2:
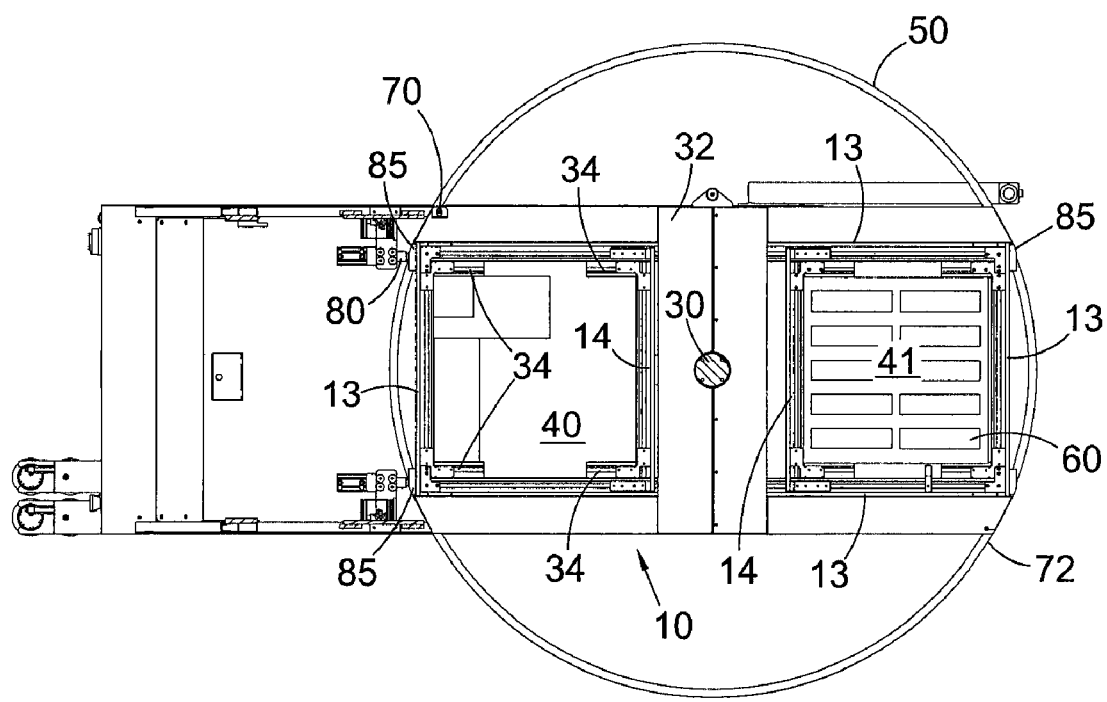
FIG. 2 is a part sectional view of the apparatus of FIG. 1 according to line A-A.
Figure 3:
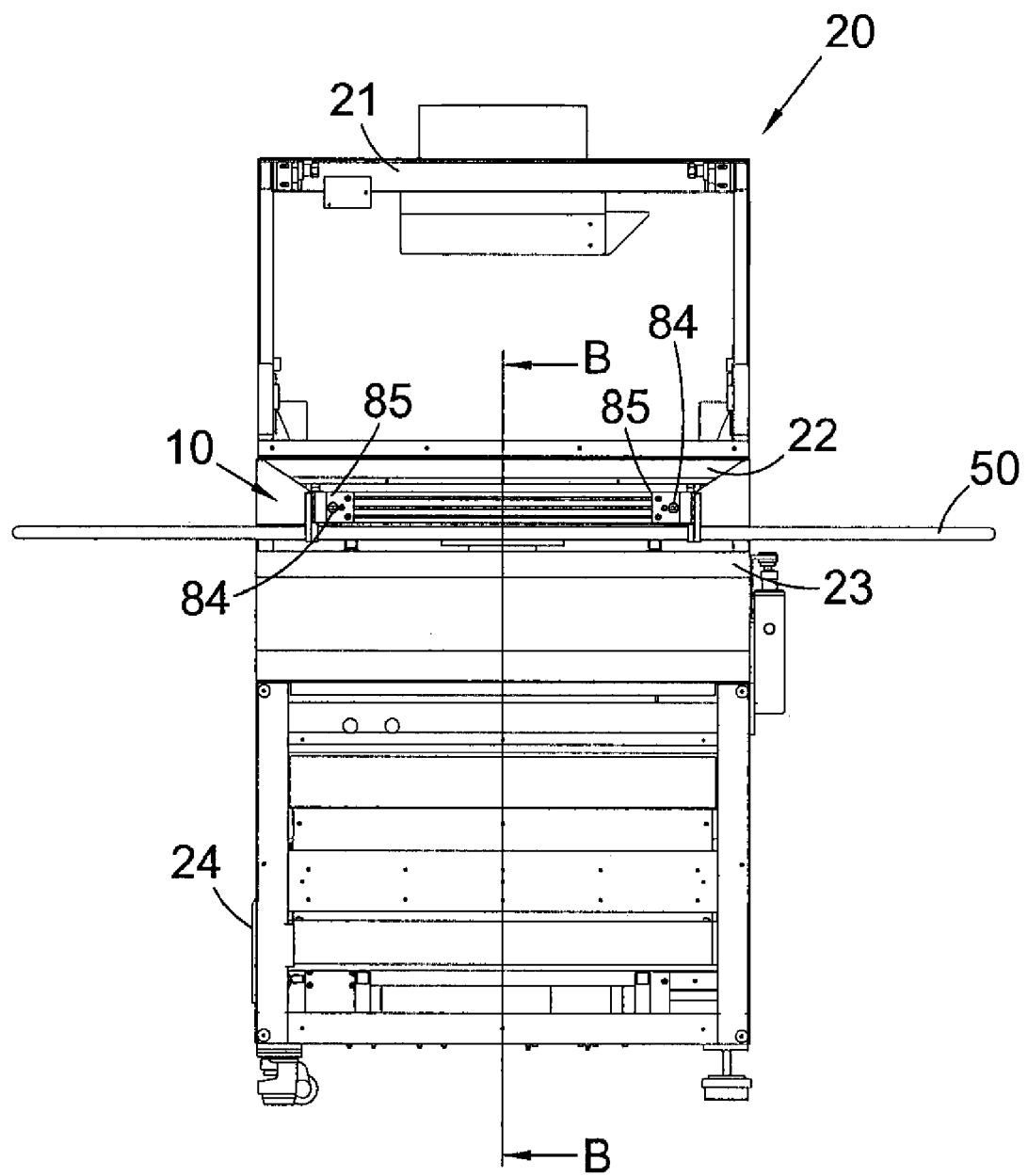
FIG. 3 is a front view of the apparatus of FIG. 1.
Figure 4:
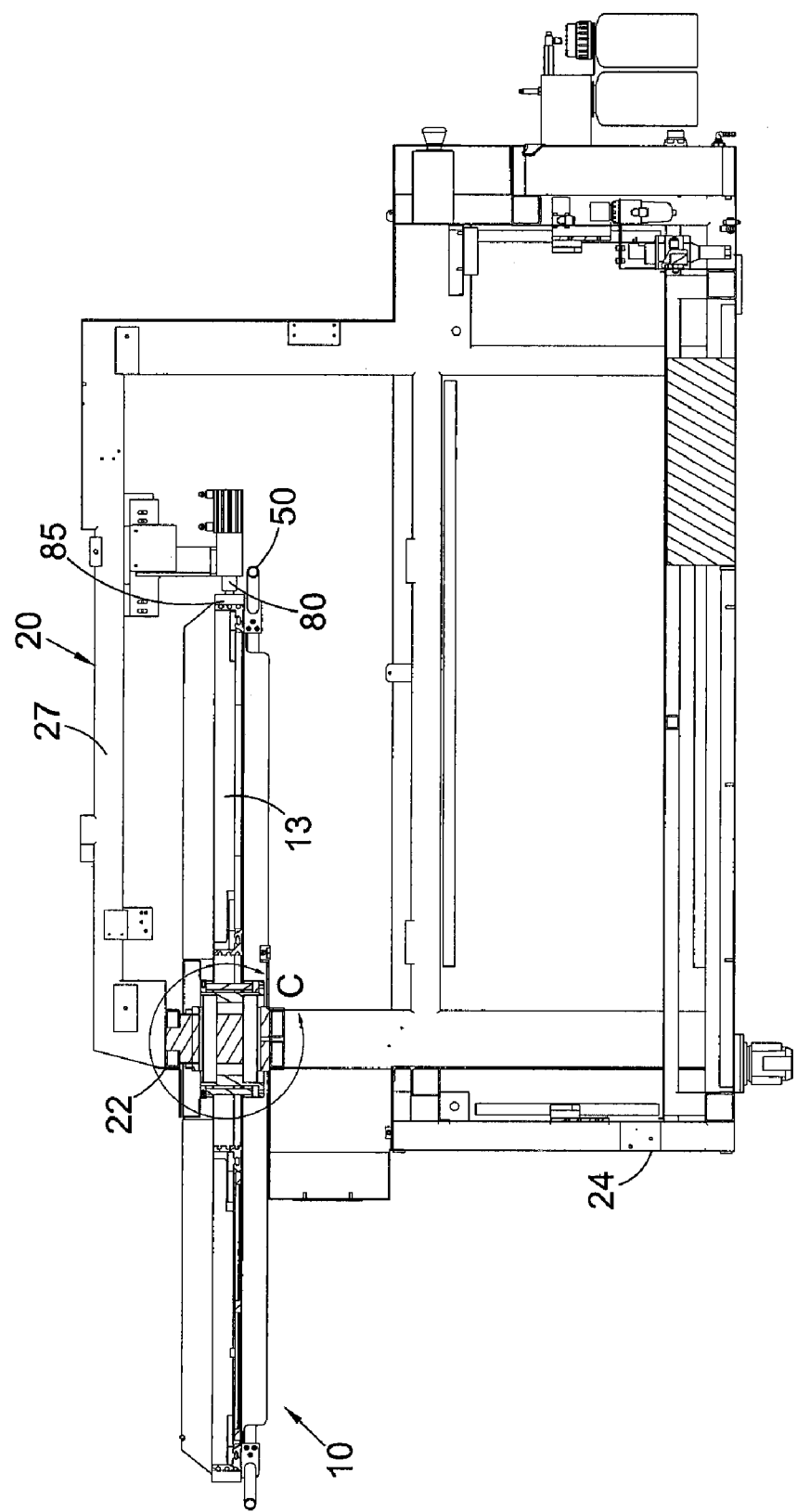
FIG. 4 is a part sectional view of the apparatus of FIG. 3 according to line B-B.
Figure 5:
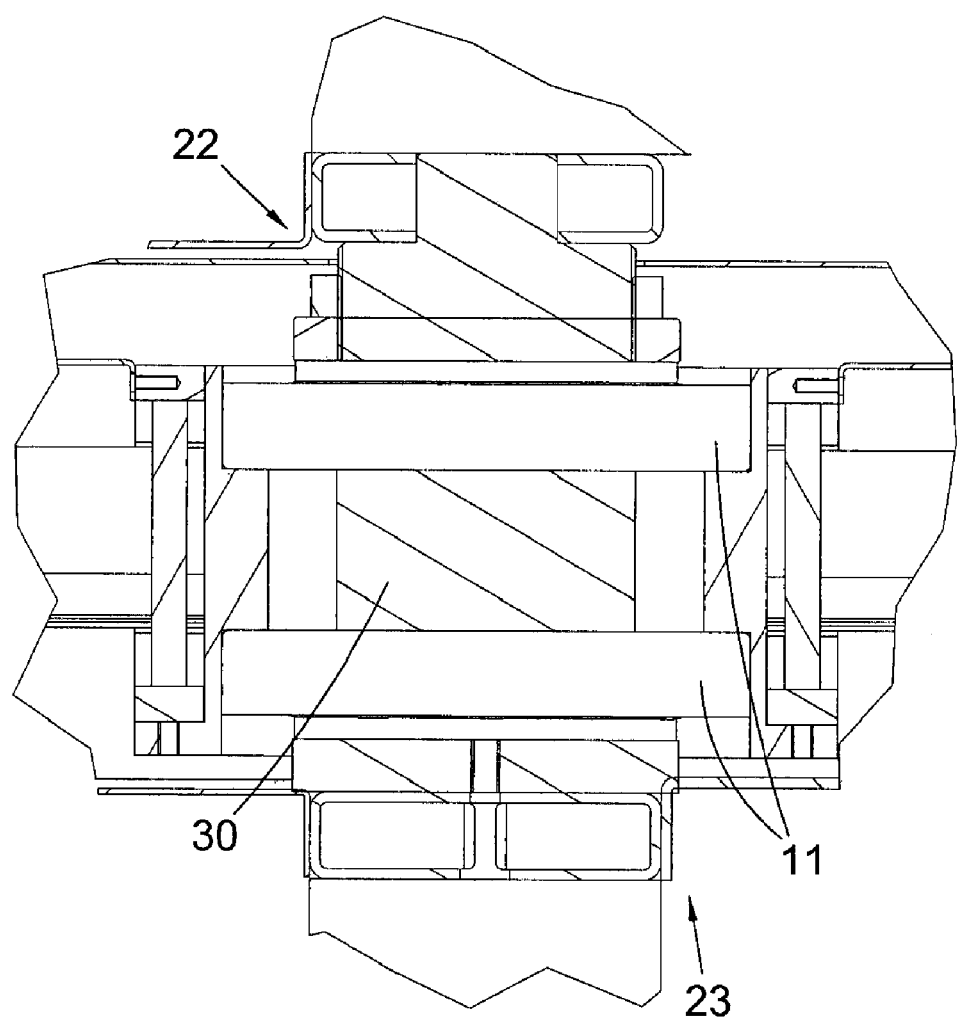
FIG. 5 is a detail view "C" taken from FIG. 4.

Referring to FIGS. 1 to 5, there is shown a first embodiment of soldering apparatus 100 in accordance with the present invention. It comprises a rotatable deck 10, pivotally mounted to a frame 20 of a soldering apparatus 100 by a shaft 30. Details of the pivotal mount are shown in FIG. 5. As can be seen the mount includes roller bearings 11, and the shaft 30 is fixed to an upper arm 22 and a lower arm 23 of the frame 20. Those arms 22, 23 form crossbeams of the stationary frame 20, as shown in FIG. 3.

The frame 20 also comprises a base 24. That base 24 encloses the power systems of the soldering apparatus, such as electric motors (not shown in the Figures). The frame and power systems, however, can be generally conventional, other than where adapted to accommodate the rotatable deck, as can the fluxing and soldering equipment. For example, an X, Y and Z axis movable fluxing and soldering arrangement can be incorporated into the frame, under the deck, as shown, for example, in WO2009/027651.

The deck 10 is formed by connecting two sets of three outer beams 13 together, each to form three sides of a square or rectangle, and then connecting the two free ends of each square or rectangle either side of a central beam 32. Preferably the beams are aluminium profiled beams, and they all extend in a common X-Y plane—parallel to the rotation plane—the pivot mechanism is formed in the middle of the central beam 32.

The outer shape of the resulting deck 10 is rectangular.

A further (fourth) inner transverse beam 14 (also preferably an aluminium profiled beam) is also provided for each square or rectangle to complete the two squares or rectangles formed by beams 13, whereupon each square or rectangle defines an opening that forms a PCB work station 40, 41 inside the square or rectangle. Brackets or other PCB holding mechanisms or flanges 34 can be provided integral to the beams, or as separate components, for locating the PCBs accurately within the work stations. See FIG. 2.

A circular handle 50 is attached to the deck concentrically thereto and is used for manually rotating the rotatable deck, or for delimiting the safety zone around the soldering apparatus 100—it defines a maximum diameter occupied by the rotating deck (as it rotates) for safety purposes.

In FIG. 2, a PCB 60 is positioned in one of the work stations 41 ready to receive PCB electronics components (not shown in the Figures). That location for the work station 41 (outside the frame of the soldering apparatus 100) is said to be a loading or pre-loading position, i.e. it is positioned for receiving the blank PCB, and then the electronics components for the PCB. An operator (not shown) stands in front of that loading station to work at that location. Alternatively, a robotic arm may perform the loading function.

The other work station 40 on the deck 10 is also shown in FIG. 2. That location for the second work station 40 is said to be a soldering position, i.e. it is positioned within the frame, above the base 24 of the frame, for having the fluxing and soldering operations carried out on any PCB within the work station 40. The fluxing and soldering mechanisms for carrying out those operations are well known in the art, and can be dip soldering apparatus, jet soldering apparatus or wave soldering apparatus, dependent upon the form of the PCB to be soldered, also as known in the art. Preferably, however, the soldering device will be a dip or jet soldering nozzle mounted onto an automated X, Y and Z axis translation mechanism, as also known from the art, but not shown herein.

In the configuration shown in FIG. 2, while PCB components are being loaded onto a PCB in the first work station 41 at the loading position, another already-loaded PCB is being fluxed and soldered at the other work station 40 within the frame of the soldering apparatus. This arrangement improves upon production turnaround times, and quality reliability, for low-production volume PCB designs, as well as longer run items, since the PCBs can be loaded with their PCB components on the soldering apparatus, thereby reducing loaded PCB transfer times and also reducing finished PCB abnormalities occurring as a result of knocks or movements occurring during any manual transportation of the loaded PCB to the soldering apparatus prior to soldering.

When both the pre-loading and soldering operations are completed, the deck 10 is manually (or electrically—with a motor) rotated until the position of the two work stations 40, 41 has been swapped. At this point, the pre-loading and soldering operations can start again.

In this two work station arrangement, a soldered PCB will of course first need to be removed from the work station 40 that is now presented to the operator at the loading position.

It is important that the deck 10 is rotated through a correct angle each time that the position of work stations 40, 41 is swapped. This is to ensure that the newly loaded PCB within the soldering position is correctly registered with the soldering and fluxing systems. To ensure that the correct degree of rotation has been applied, a sensor 70 is positioned on the frame 20 above the deck (here, above the handle 50 of the deck 10) for sensing the rotation angle by looking for a marker on the beam. That marker can be a post or a mark 72—in the illustrated embodiment, two marks are provided—one for each work station. FIG. 2 shows just the second mark 72 (for the first work station 41).

Different sensing technologies can also be suitable for this purpose.

When the correct angle has been applied to deck 10, the sensor 70 outputs a "correct rotation" signal, which can be recognised by an operator or a computer. At this point, the deck needs to be locked into a fixed position so as to ensure a correct soldering of the PCB within the soldering apparatus—some PCBs soldered with these machines are highly expensive specialist PCBs whereby soldering errors cannot be financially tolerated. That locking procedure also provides a mechanical registration of the deck to the frame of the apparatus 100, and is achieved, in the illustrated embodiment, by a pair of locator pins 80 mounted on frame 20. The locator pins 80 are activated either manually or automatically for registering the deck to the frame.

In this particular embodiment, the locator pins 80 become actionable only after a correct rotation angle has been applied to deck 10, since the actuator 82 for the locator pins 80 only becomes active while the sensor 70 is confirming the correct approximate registration of the deck 10, by its reference to the mark 72 of the relevant work station 40, 41. However, once active, and receiving a command to lock the deck, the locator pins 80 move axially out from the actuator and into location holes 84 within plates 85 provided on the beams of the deck 10. These holes 84 and plates 85 can be seen for the unlocked station 41 in FIG. 3.

FIG. 3 shows further details of the arrangement of the deck 10 relative to the frame 20. As shown, the deck 10 sits between the crossbeams 22 and 23 of the stationary frame 20. However, the frame 20 also has an upper crossbar 21 for carrying a top-heating arrangement in a conventional manner. The soldering and fluxing equipment (not shown), is located underneath the deck also in the conventional manner.

A bottom heating arrangement can also be supplied. Although not shown, it can be arranged on sliding rails underneath the deck for sliding into and out of registration with the underside of a PCB in a work station of the deck 10. It needs to be removable from the underside of the PCB during the fluxing and soldering operations since access to the underside of the PCB within the soldering position is necessary—dip, wave and jet soldering is carried out on the underside of the PCB.

The bottom heating arrangement heats the PCB before soldering, and the heater can be located under the loading station for sliding into or out of the soldering position. This is possible with this arrangement, without taking up additional floor space, since the loading position already sticks out of the front of the soldering apparatus.

Figure 6:
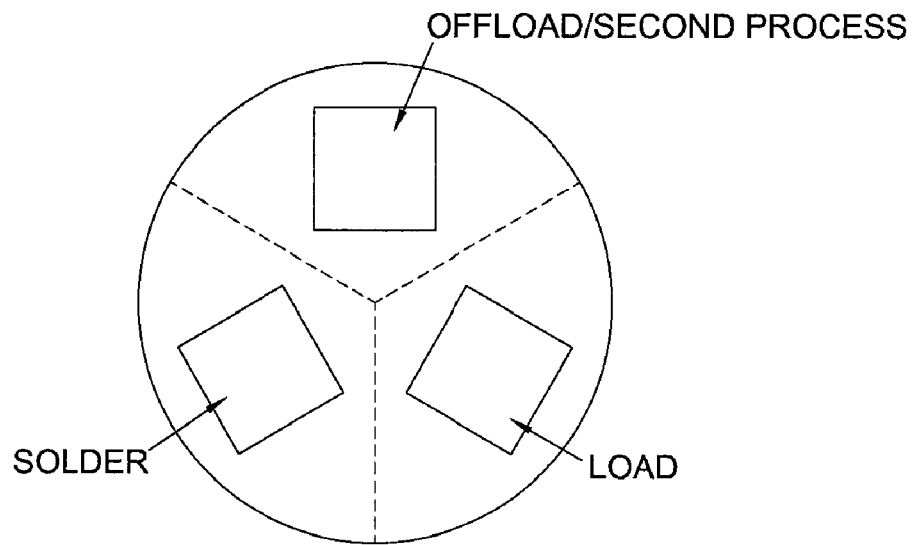
FIG. 6 is a schematic representation of a three-station soldering apparatus according to an embodiment of the present invention.

Referring next to FIG. 6, a variation of the device of FIGS. 1 to 5 is schematically illustrated. It is again a stand alone apparatus. However, instead of just the two work stations 40, 41, there are three equally spaced work stations, all provided on a common rotatable deck. During use there will be someone loading a PCB at the first station, a soldering or fluxing operation at the second station and a second person unloading/checking a soldered PCB at a third station.

It is therefore clear that with the present invention, when one of the work stations of the deck is located wholly within the frame of the soldering apparatus for access by the soldering mechanism within the soldering apparatus, at least one other work station of the deck is located wholly externally of the frame of the soldering apparatus for access by an operator. This allows two functions to be carried out simultaneously with the soldering apparatus, namely soldering and loading.

Figure 7:
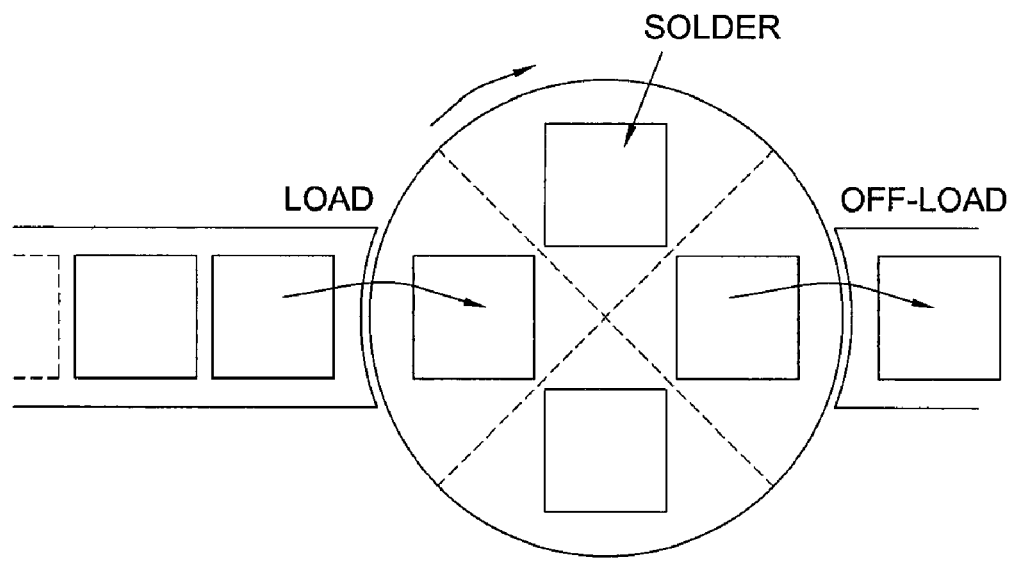
FIG. 7 is a schematic representation of a soldering apparatus according to an embodiment of the present invention integrated into an in-line soldering arrangement.
Figure 8:
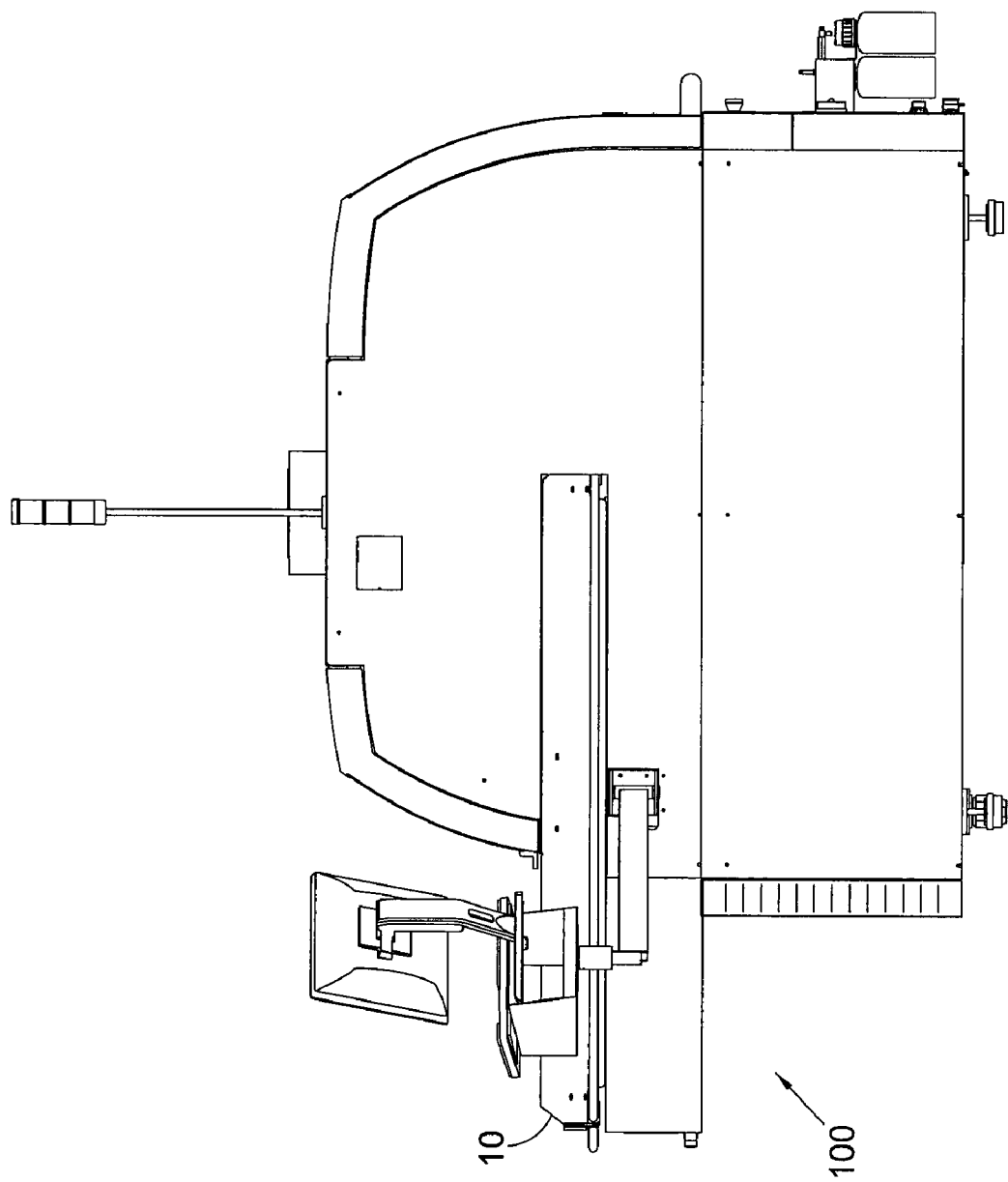
FIG. 8 is a side elevation of a further embodiment of the present invention, with an underslung pre-heating unit underneath the deck.
Figure 9:
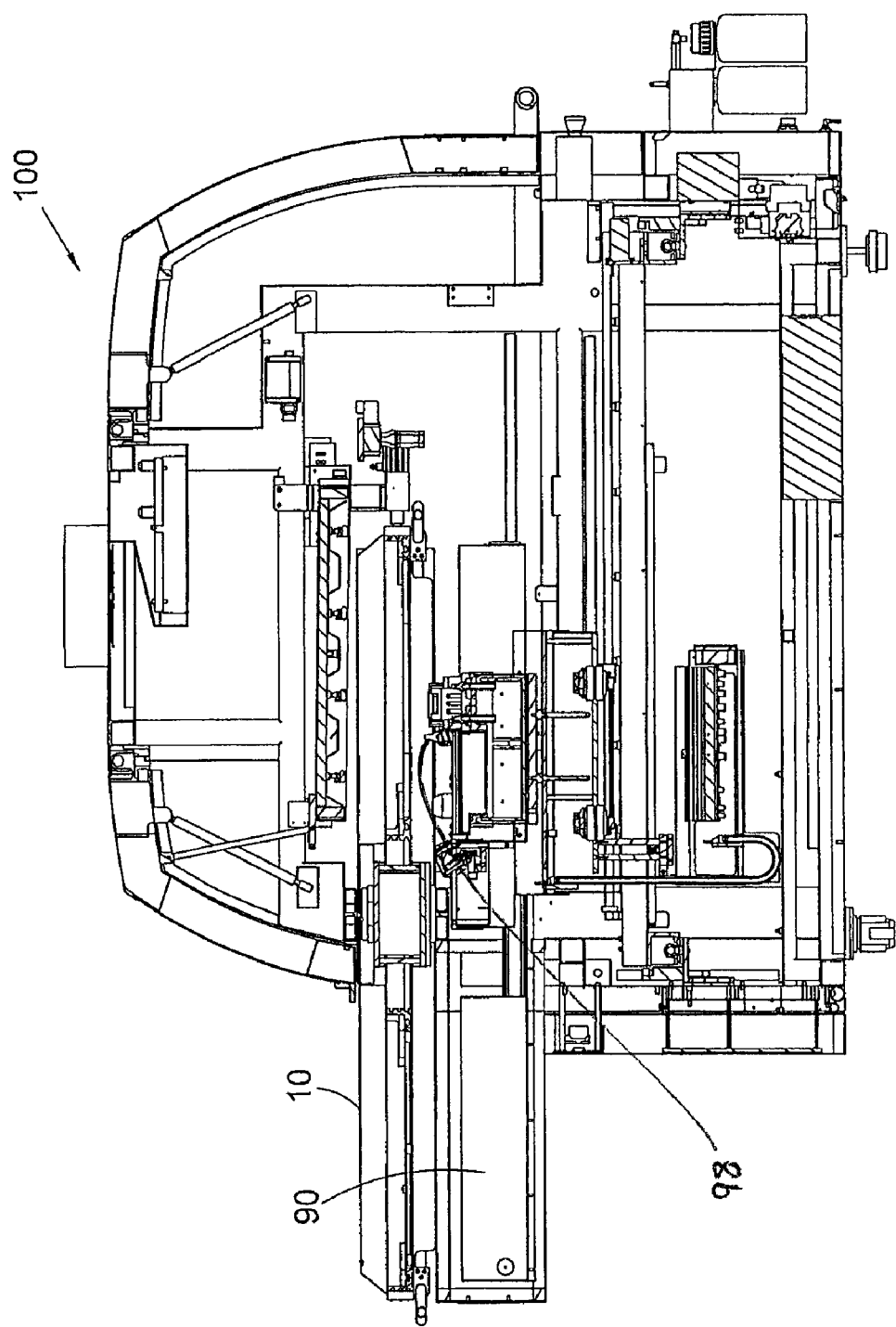
FIG. 9 is a partial section through the soldering apparatus of FIG. 8.
Figure 10:
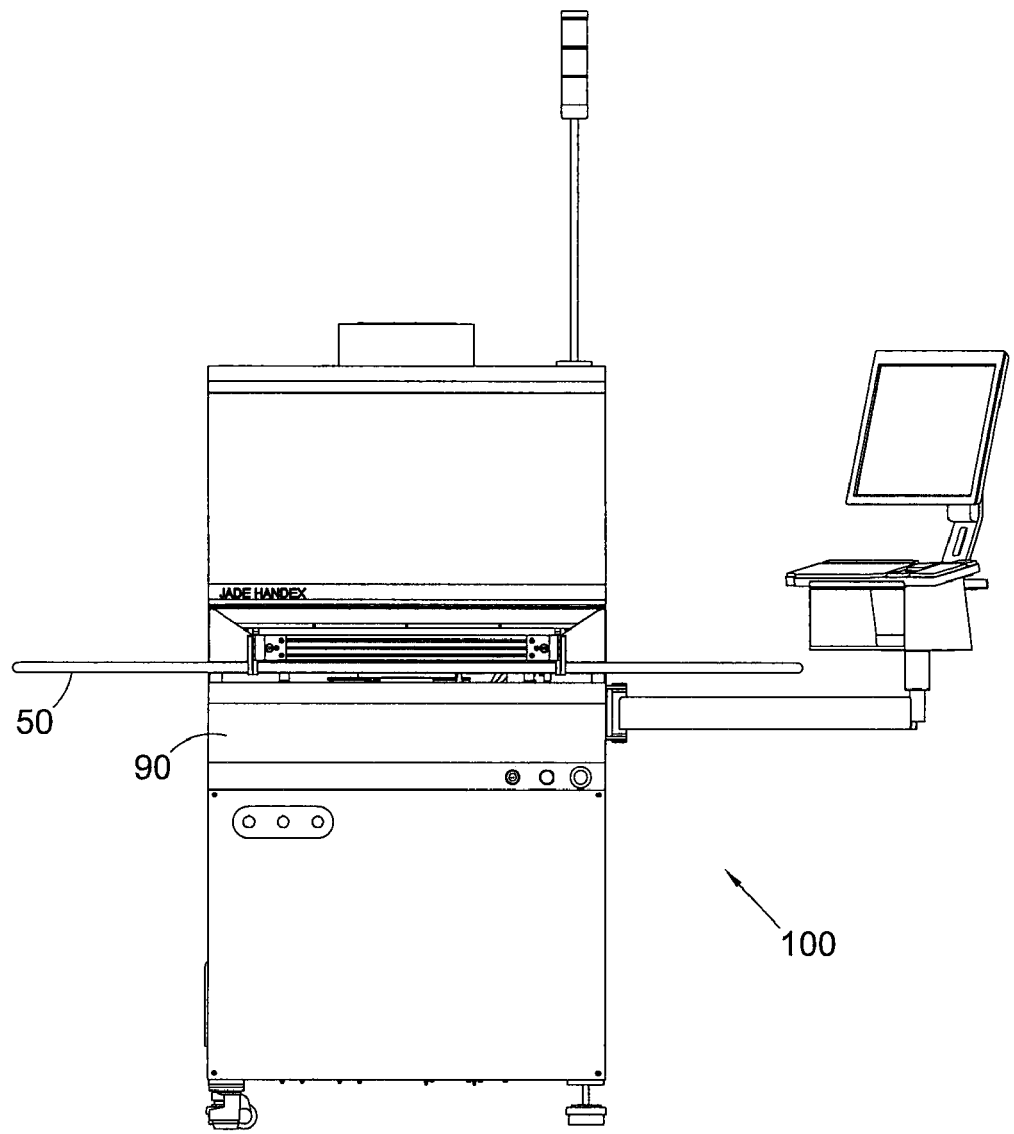
FIG. 10 is a front elevation of the soldering apparatus of FIG. 8.
Figure 11:
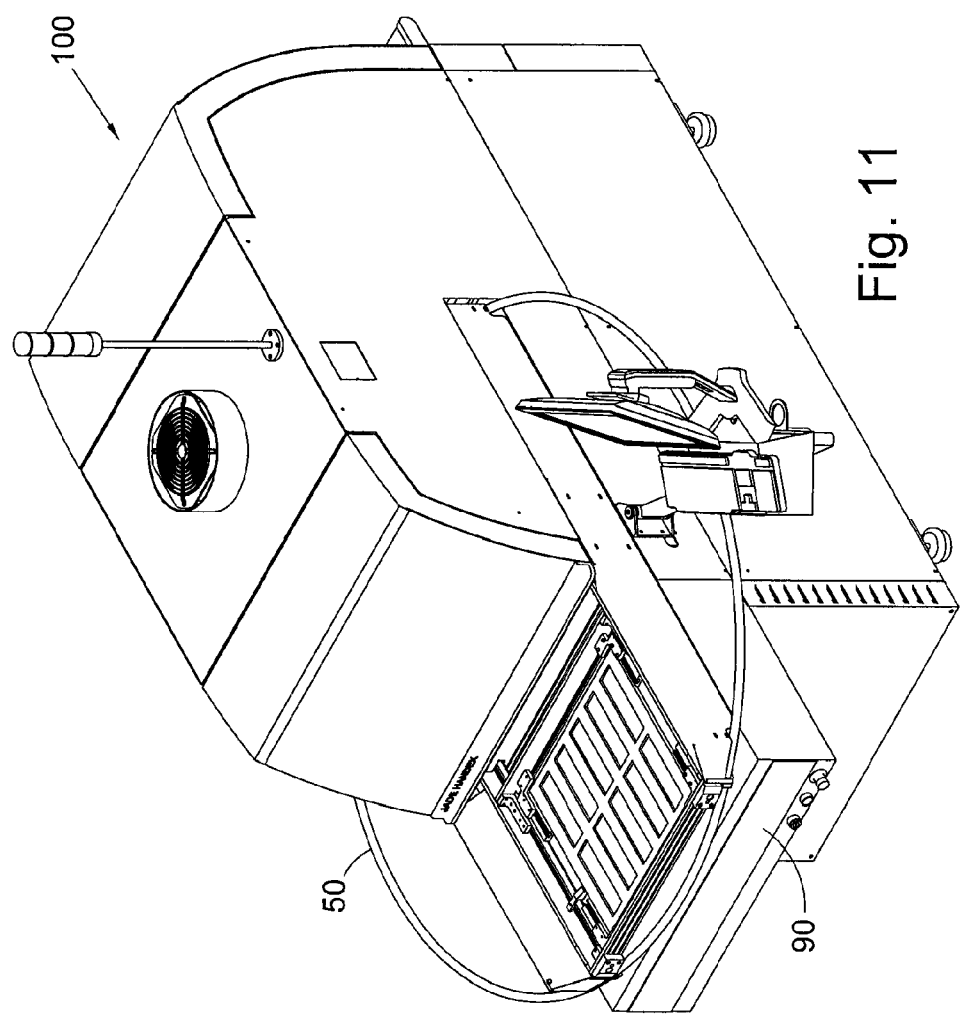
FIG. 11 is a front, upper perspective view of the soldering apparatus of FIG. 8 showing a PCB within the loading section of the deck.
Figure 12:
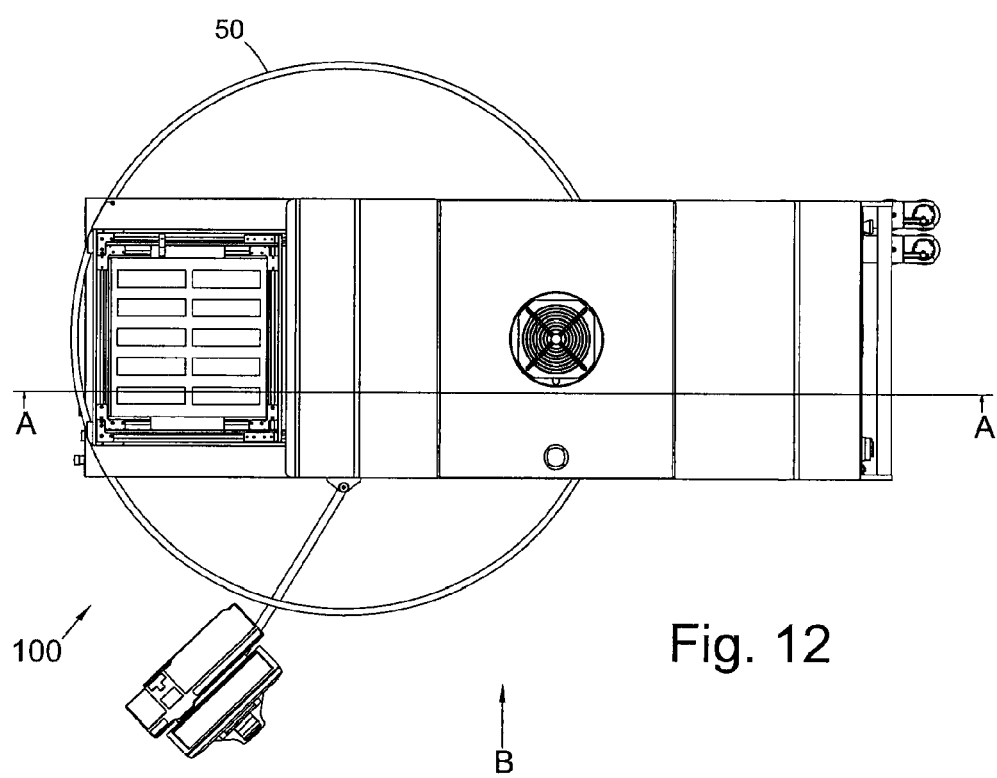
FIG. 12 is a plan view of the soldering apparatus of FIG. 8, again showing a PCB within the loading section of the deck.

Referring next to FIG. 7, the incorporation of the present invention into a production line is schematically illustrated. By providing three functioning stations and a fourth potentially non functional station each 90° apart around a turntable, a linear production line can have the present invention incorporated into it—the loading station can be one the opposite side of the turntable to the unloading station, with the soldering station arranged 90° thereto.

Finally, referring to FIGS. 8 to 12, a further embodiment of the present invention is illustrated. It operates in much the same manner as that of the first embodiment, in that it has a deck 10 with a circular handle 50, and with two work stations thereon. However, underneath the deck 10 is provided a PCB preheater housing 90. That housing is for housing a PCB heater. The heater can be conventional (for heating the entire PCB, or it may offer localised heating by being a directional heater. The housing (and the heater) is mounted below the PCB, rather than in the more conventional position of above the PCB, i.e. it is no longer in the hood of the soldering apparatus. A second heater might, however, be provided in that conventional position—in the hood.

Although not shown, the heater within the PCB preheater housing 90 can be mounted on sliders. That is to allow the heater to be moved into and out of the middle of the soldering apparatus, i.e. into and out of the soldering area within the soldering apparatus. The soldering assembly 98 within that soldering area can be moved into a park position to make room for the heater within that soldering area. That park position may be a corner of, or otherwise outside of, the soldering area, or else it might be reached simply by moving the soldering assembly downwards.

Other conventional modifications and arrangements can also be incorporated into the soldering apparatus of the present invention.

The present invention has therefore been described above purely by way of example. It should be noted, however, that modifications in detail may be made within the scope of the invention as defined in the claims.

What is claimed is:

1. A soldering apparatus comprising:
a PCB loading deck having at least two PCB work stations in or on which a PCB and electronics components therefor can be loaded, and in or on which that then loaded PCB can then be soldered within the soldering apparatus; a PCB bottom heater; and a slidable mount for the PCB bottom heater for moving the PCB bottom heater into and out of a heating position, the heating position being under the PCB loading deck.

2. A soldering apparatus according to claim 1, wherein the PCB bottom heater is for heating an entire PCB on the PCB loading deck.

3. A soldering apparatus according to claim 1, wherein the PCB bottom heater is a directional heater for offering localised heating of a PCB on the PCB loading deck.

4. A soldering apparatus according to claim 1, wherein the PCB bottom heater is housed within a PCB preheater housing located underneath the PCB loading deck.

5. A soldering apparatus according to claim 1, comprising a heating element for positioning above a PCB within the PCB loading deck.

6. A soldering apparatus according to claim 1, wherein a second heater is provided in a hood above the PCB loading deck.

7. A soldering apparatus according to claim 1, the PCB bottom heater being movable into its heating position by being moved under one of those said work stations.

8. A soldering apparatus according to claim 1, wherein the slidable mount comprises sliders or one or more rail, the slidable mount allowing the PCB bottom heater to be moved into and out of a soldering area within the soldering apparatus.

9. A soldering apparatus according to claim 8, wherein the soldering area is in the middle of the soldering apparatus.

10. A soldering apparatus according to claim 8, comprising a soldering assembly within that soldering area that can be moved into a park position to make room for the PCB bottom heater within that soldering area.

11. A soldering apparatus according to claim 10, wherein said park position is a corner of the soldering area.

12. A soldering apparatus according to claim 10, wherein said park position is a position lying outside of the soldering area.

13. A soldering apparatus according to claim 10, wherein said park position can be reached by moving the soldering assembly downwards.

14. A soldering apparatus according to claim 1, wherein the PCB loading deck is mounted for rotation relative to a frame of the soldering apparatus within the plane of the deck.

15. A soldering apparatus according to claim 14, wherein the PCB loading deck is mounted horizontally, and is configured for rotation about that horizontal plane.

16. A loading deck according to claim 1, wherein a circumferential handle is supplied surrounding the whole PCB loading deck to define a safety barrier.

17. A soldering apparatus according to claim 1, wherein the heating position is within a frame of the soldering apparatus.

18. A soldering apparatus according to claim 1, wherein a foot pedal is provided for providing a control for the deck.

19. A soldering apparatus according to claim 18, wherein the pedal interacts with a deck registration system comprising one of a) at least one sensor for sensing or confirming a location of the deck relative to the frame, or b) at least one locator pin for providing a mechanical registration of the deck relative to the frame of the soldering apparatus.

20. A soldering apparatus comprising:
   a PCB loading deck in or on which a PCB and electronics components therefor can be loaded, and in or on which that then loaded PCB can then be soldered within the soldering apparatus by a soldering assembly in the form of a dip, wave or jet soldering assembly;
   a PCB bottom heater separate to the soldering assembly; and
   a slidable mount for the PCB bottom heater for moving the PCB bottom heater into and out of a heating position, the heating position being under the PCB loading deck for pre-heating the PCB prior to soldering.

* * * * *